United States Patent [19]

Ismail et al.

[11] Patent Number: 6,104,705
[45] Date of Patent: Aug. 15, 2000

[54] GROUP BASED CONTROL SCHEME FOR VIDEO COMPRESSION

[75] Inventors: Nermeen Ismail, Mountainview, Calif.; Hugo J. Strubbe; Jorge Caviedes, both of Yorktown Heights, N.Y.; Max Wu, Ossining, N.Y.

[73] Assignee: U.S. Philips Corporation, New York, N.Y.

[21] Appl. No.: 09/001,319

[22] Filed: Dec. 31, 1997

[51] Int. Cl.[7] ................................................. H04L 12/16
[52] U.S. Cl. .......................... 370/260; 370/229; 379/202; 348/15
[58] Field of Search ..................................... 370/229, 230, 370/235, 259, 260, 261, 431, 465, 468; 379/202, 203, 204, 206, 201; 348/12, 13, 14, 15

[56] References Cited

U.S. PATENT DOCUMENTS

| | | | |
|---|---|---|---|
| 5,263,025 | 11/1993 | Torii et al. | 370/468 |
| 5,463,620 | 10/1995 | Sriam | 370/412 |
| 5,546,392 | 8/1996 | Boal et al. | 370/395 |
| 5,638,363 | 6/1997 | Gittins et al. | 370/358 |
| 5,673,253 | 9/1997 | Shaffer | 370/229 |
| 5,684,527 | 11/1997 | Terui et al. | 348/15 |
| 5,742,594 | 4/1998 | Natarajan | 370/336 |
| 5,867,663 | 2/1999 | McClure et al. | 709/234 |
| 5,953,336 | 9/1999 | Moore et al. | 370/395 |

*Primary Examiner*—Ajit Patel
*Assistant Examiner*—Brian Nguyen
*Attorney, Agent, or Firm*—Daniel J. Piotrowski

[57] ABSTRACT

A method by which video compression parameters of different video streams are changed to optimize overall bandwidth utilization according to rules related to the varying interactions among group members. Different video streams are allocated different portions of the overall bandwidth based on a priority scheme. The priority scheme is based upon group dynamics. A controller (central or distributed) receives a group dynamics monitoring signal which monitors the various activities of group members. The controller (central or distributed) uses the network congestion control feedback signal and the priorities assigned to the different video streams to send feedback signals to the different video transmitters requesting the transmitters to adhere to, increase, or decrease their video data rates by changing parameters controlling the video encoding process.

11 Claims, 3 Drawing Sheets

GROUP BASED CONTROL SCHEME FOR VIDEO COMPRESSION

BACKGROUND OF THE INVENTION

1. Field of the Invention

The present invention is directed toward a group based control scheme for video compression.

2. Description of Related Art

Most of the body of work in this field utilizes networking based feedback to control video compression parameters. See, for example, Wakeman et al., "*Multicast Congestion Control in the Distribution of Vatiable Rate Video on the Internet*", Proceedings of SigComm 1994 (hereinafter "Wakeman").

Other research has addressed "User-Centered Video" wherein attempts are made to control video compression parameters of different video streams based on the level of interest of each receiver in a system. Such a scheme works fine for a unicast based "video-on-demand" system. It does not work, however, for multicast group based activities such as internet video conferencing applications. See, Yamaahi et al., "*User-Centered Video: Transmitting Video Images Based on the User's Interest*", Proceedings of CHI 1995.

U.S. Pat. No. 4,494,232 entitled "Statistical Multiplexer with dynamic Bandwidth Allocation for Asynchronous and Synchronous Channels" (1985) addresses multiplexing different streams of data, both synchronous and asynchronous, given certain control signals coming from data terminal equipment (DTE); however, bandwidth allocation to specific users/applications within an ongoing group session is not controlled.

U.S. Pat. No. 5,600,797 entitled "System for Identifying New Client and Allocating Bandwidth Thereto by Monitoring Transmission of Message Received Periodically from Client Computers Informing of their Current Status" (1997) addresses the issue of initiating a communication session among different machines on a network through a central manager. The central manager also allocates the required bandwidth according to the reception of valid client requests.

E.P. application 258,514 entitled "Optimized Bandwidth Allocation Mechanism Between Circuit Slots and Packet Bit Stream in a Communication Network" (1988), E.P. application 713,347 A2 entitled "Method and Apparatus Enabling STM and Packet Mode Access on a Broadband Communications Network" (1996), and E.P. application 479,4332 A2 entitled "Method and Apparatus for Dynamic Channel Bandwidth Allocation Among Multiple Parallel Video Coders" (1992), all relate to very low level, e.g., ICs, packets, and parallel video coders, dynamic bandwidth allocation mechanisms on a low 'hardware' level.

SUMMARY

The present invention comprises a method by which video compression parameters of different video streams are changed to optimize overall bandwidth utilization according to rules related to the varying interactions among group members. Different video streams are allocated different portions of the overall bandwidth based on a priority scheme. The priority scheme is based upon group dynamics. A controller (central or distributed) receives at least two types of signals: a network congestion control signal which indicates the overall quality of delivered video streams and whether more or less bandwidth needs to be allocated for that particular video stream, and a group dynamics monitoring signal which monitors the various activities of group members. The controller (central or distributed) uses the group dynamics monitoring signal to assign priorities assigned to the different video streams according to a set of rules supplied by the application. The controller then uses these priorities to divide the bandwidth available to the application, that is being supplied to the controller either directly through the network congestion control signal or calculated using it, among the different video streams. The new bandwidth portions are then sent to the different video encoders which should change their video output rate, by changing some controlling parameters within the Codec, to adhere to the ones sent by the controller.

DETAILED DESCRIPTION OF THE PREFERRED EMBODIMENT

Figure 1:
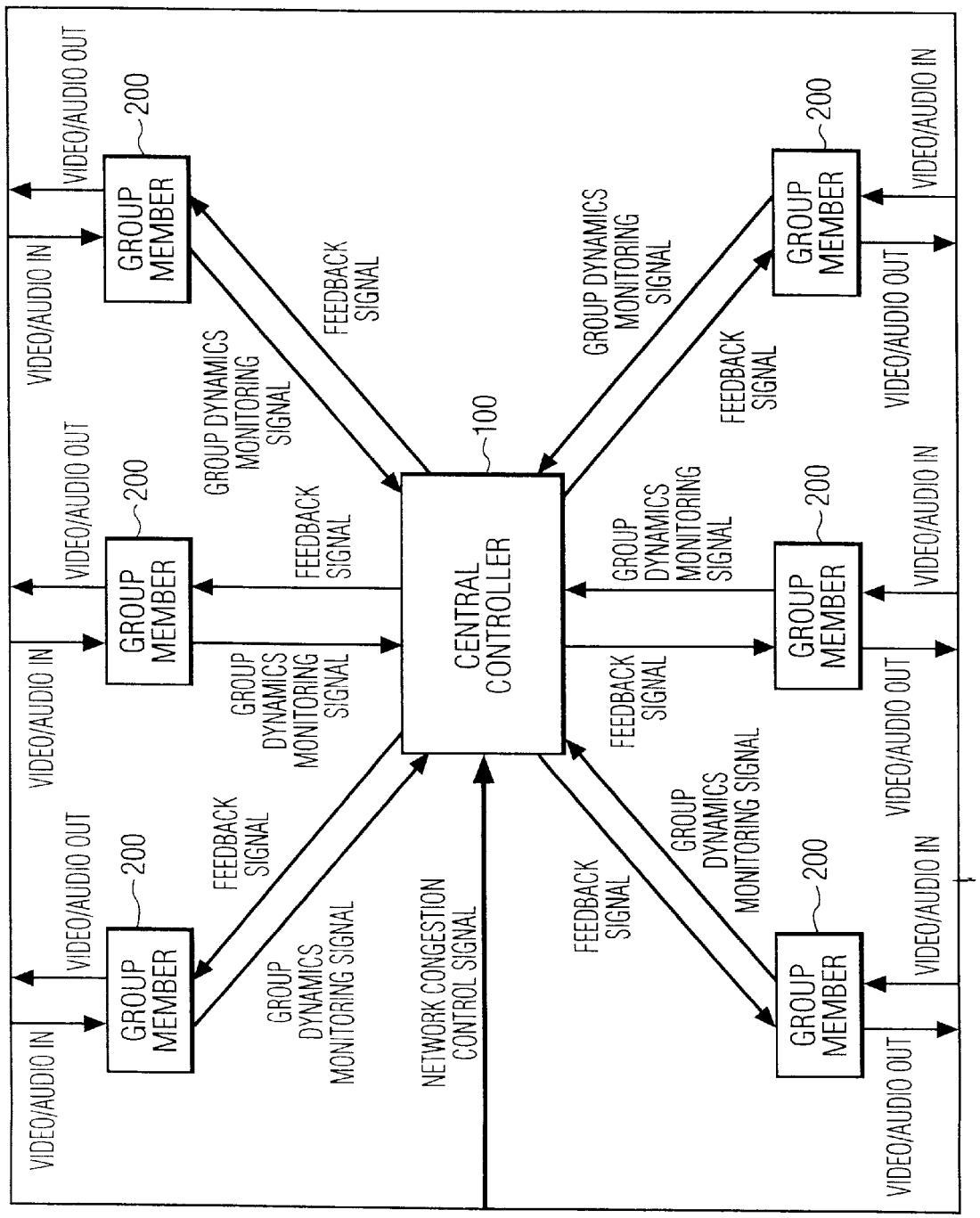
FIG. 1 illustrates a schematic of the network architecture of the various group members and controller (central or distributed).

The present invention shall now be described with reference to the accompanying figures wherein like numerals shall represent like elements in the various figures.

Most groupware applications (e.g. video conferencing, distance learning) require transmission of multiple video streams among groups of people. Multimedia streams are generally compressed according to standards such as MPEG and H.261 for video, and PCM and GSM for audio. Despite compression, currently deployed networks usually do not have enough bandwidth capacity to allow continuous transmission of multiple high quality video streams. This is especially true for anyone accessing networks via modems or other dial-up type connections.

Video compression algorithms such as MPEG and H.261 provide different levels of compression by using different quantization tables or changing the video frame rate. Different compression levels result in compressed streams having different data rates. Usually, multi-use video communication tools use these characteristics of compression algorithms to adapt their output data rate according to networking feedback.

A method is desired by which video compression parameters of different video streams are changed to optimize overall bandwidth utilization according to rules related to the varying interactions among group members. In other words, given a limited bandwidth, different video streams are allocated different portions of the bandwidth based on a priority scheme.

According to the present invention, there is a minimum data rate allocated for each video stream in the system. Below this minimum data rate the video stream does not convey meaningful information to members in the group. The minimum data rates are content based and are best set by the video application (group member) that is sending the video stream. Member interactions and/or group communication sessions are dynamically analyzed and result in generation of high level signals that can be used as a feedback controller for video data rate thereby allowing video communication to take place on low bandwidth links while improving video quality on high bandwidth links.

An example would be when only one group member is talking for a long time while other group members are not generating any extraordinary activity. The video encoder of the talkative group member would start generating high bandwidth video while the other group members encoder's can be temporarily degraded.

A controller (central or distributed) receives at least two types of inputs. The controller, if distributed, can be an integral part of the application or a separate part that ends feedback to the application through some interprocess communication mechanism. One is a network congestion control signal which may indicate overall quality of delivered video streams and whether more or less bandwidth needs to be allocated for that particular video stream. A second signal is a group dynamics monitoring signal which monitors various activities of group members. Activities include audio, video, data, keyboard, mouse, etc. This high level signal describing the status (e.g., dominating, active, inactive) of each group member is generated and then received on each group member's activity.

The network congestion control signal is typically used to estimate the overall bandwidth available for an application and all of its video streams, such as a signal described in "Wakeman". This signal can differ based upon the type of network. In a network that supports resource reservation so that bandwidth can be reserved by the application (e.g. ATM), this signal will be static. In a network that does not support resource reservation (e.g. internet), this signal can be a congestion control signal reporting overall congestion status of the group. This signal can then be used to determine the currently available bandwidth that can be used by the application. In this case the signal is dynamic.

The controller then assigns priorities to the different video streams of the group members based upon the status determined by the group dynamics monitoring signal. The controller uses priorities to divide bandwidth available to the application, supplied directly or indirectly through the network congestion signal, between different video streams. The assigning process is preferably based upon the nature of the group activity or supplied by the application. For instance, some activities such as teaching may assign an inactive group member a high priority while other activities such as a business meeting would assign an inactive group member a low priority.

In an example implementation of "application rules", two tables are used. A first table, a table of conditions, specifies conditions that trigger a change of priorities. A second table, a table of actions, specifies for each condition, what priority change should be performed. The concept of 'roles' may also be used in the process of assigning video stream priorities.

Consider a teaching session where a teacher and a group of students come together to discuss an assignment. Only the audio signal is going to be used to describe the group activities. There are two roles, teacher and student. A session management-like protocol is desired so that the controller can know about new users in terms of identifying each user, and how to send/receive data from that user's role. If the controller is to be implemented as part of an application then the session management protocol used by the application can also be used by the controller. Otherwise, a specific protocol needs to be implemented.

An example table of conditions below is based on "roles".

TABLE 1

| User - Role | Signal | Condition |
|---|---|---|
| ALL | Audio OFF (INACTIVE) | 1 |
| Teacher | Audio ON (ACTIVE) | 2 |
| Student | Audio ON (ACTIVE) | 3 |
| ANY | Audio OFF (INACTIVE) | 4 |

An example table of actions is shown below.

TABLE 2

| Condition | User - Signal | Priority |
|---|---|---|
| 1 | ALL INACTIVE | Initialize |
| 2 | ACTIVE Teacher | Increase (5) |
| 3 | ACTIVE Student | Increase (2) |
| 4 | ANY INACTIVE | Decrease (1) |

In this example, priorities are within a preset range, for example 1–10. When an OFF Audio signal is received from ALL users, all user priorities will initialized, in this example, to equal priorities. If an Audio ON signal (ACTIVE) is received from the user having the Teacher role, the priority of that user is increased by a preset amount, in this example, 5. If an Audio ON signal (ACTIVE) is received from a user having a Student role, the user's priority is increased by a preset amount, in this example, 2. Lastly, if an Audio OFF (INACTIVE) signal is received from ANY of the users, then the priority of that user is decreased by 1.

The controller will analyze group dynamics monitoring signals received from each user within a specific time window and based on this information, specify which conditions within the table of conditions are triggered. Action will be taken in response to the information acquired from the table of conditions. The bandwidth will then be divided among different video streams according to the relevant priorities.

Roles need not be utilized, but instead, each activity by a user could change the priority. Similarly, the number of conditions, etc. and priority levels could easily be altered.

The controller uses the priorities assigned to the different video streams (and, in this example, the network congestion control signal) to send feedback signals back to the different video transmitters via video encoder requesting the transmitters to either adhere to, increase, or decrease their respective video data rates by changing parameters controlling the video encoding process. Parameters may include the video resolution and/or frame rate among others well known in the art. If the minimum data rate for a particular video stream cannot be achieved without sacrificing higher priority video streams, then the controller will send a stop signal to the relevant video transmitter. In this example having a stop signal, an assumption is made that each user corresponds to one video stream although this may easily be altered. Each time a new group dynamics monitoring signal is received the controller begins the priority assigning process and feedback generation again.

FIG. 1 illustrates the preferred embodiment of the invention. A controller (central or distributed) 100 is accessed and accesses a plurality of group members 200. Group members include applications and/or devices capable of sending and receiving video streams (or other types of data streams, including audio, video, and/or data, etc.). Thus, a group member may comprise a user operating a personal computer, a video teleconferencing device or any other device or application that can send and receive video streams. The various group members 200 are linked to one another such that each individual group member can broadcast or send to all others and may receive video streams from any of the other group members. Thus, this example is a multi-cast group based environment.

In addition to sending and receiving video streams, group members 200 can also send and receive control signals to controller 100. Each group member 200 periodically sends a group dynamics monitoring signal to controller 100 informing controller 100 of video stream activity currently taking place. Controller 100 processes each group dynamics monitoring signal in order to determine the optimum bandwidth requirement of each group member 200 and sends a feedback control signal instructing each group member as to how to re-configure itself for optimum bandwidth utilization. The network congestion control signal may also be used in this determination.

Figure 2:
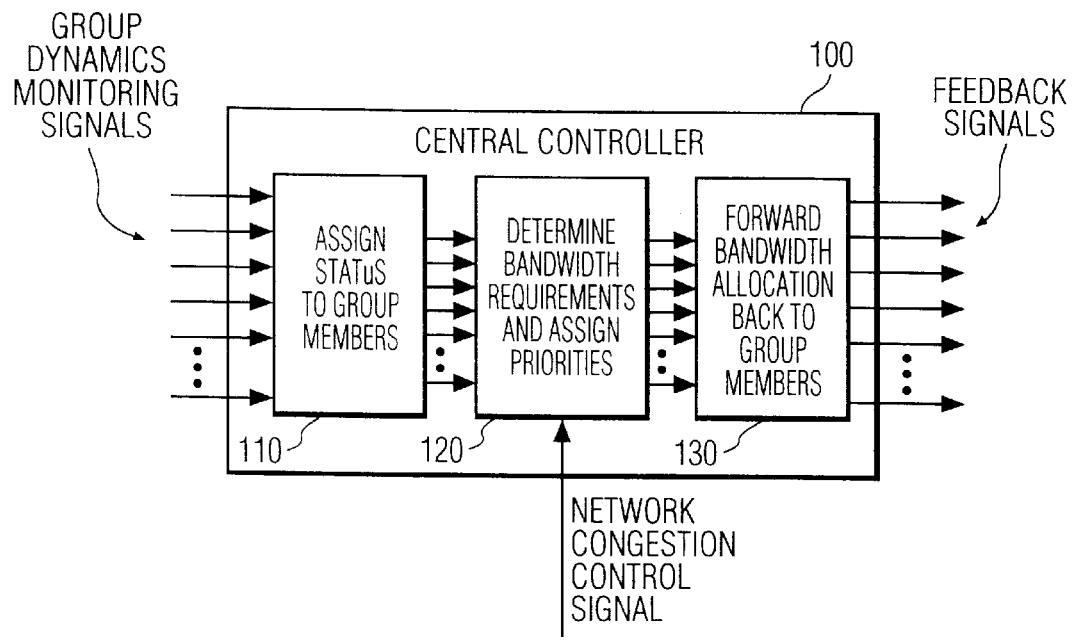
FIG. 2 is a more detailed illustration of the controller (central or distributed).

FIG. 2 is a more detailed diagram of controller 100. The group dynamics monitoring signals from the various group members are received into a module 110 that assigns a status to each group member based upon the activity of that group member. The status data is forwarded to a module 120 which also, in this example, receives the network congestion control signal. Module 120 then determines the bandwidth requirements and assigns priorities for each group member based on the received status data. Network congestion data may also be considered. Finally, the priorities and updated bandwidth allocations are sent back to each group member.

Figure 3:
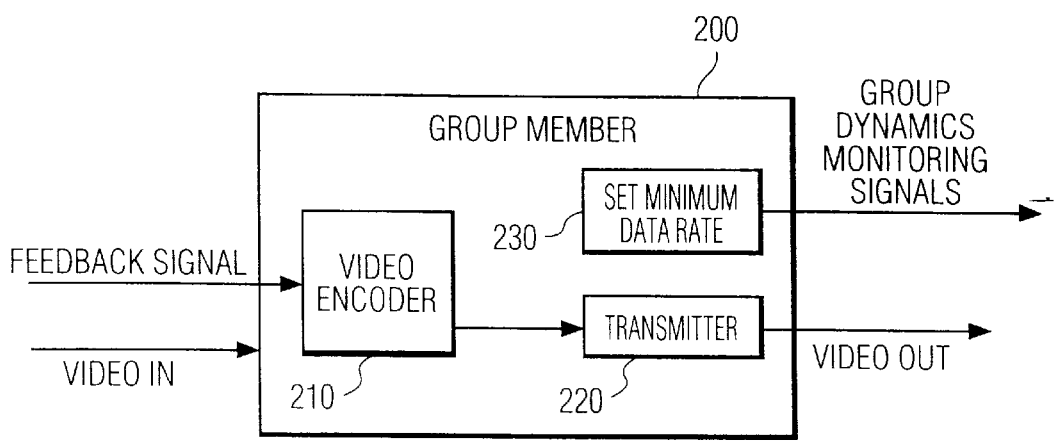
FIG. 3 is a more detailed illustration of one of the group members.

FIG. 3 is a more detailed diagram of a representative group member 200. Each group member 200 receives a pair of inputs, inbound video stream data from other group members and a feedback signal from the controller 100. Moreover, each group member 200 sends at least two outputs, a group dynamics monitoring signal to the controller 100 and outbound video stream data for the other group members. The incoming feedback signal is routed to video encoder 210 for adjusting the data rates of video before being forwarded to transmitter 220 for transmission to the group. Module 230 sets the minimum data rate needed to convey meaningful data to other users.

Figure 4:
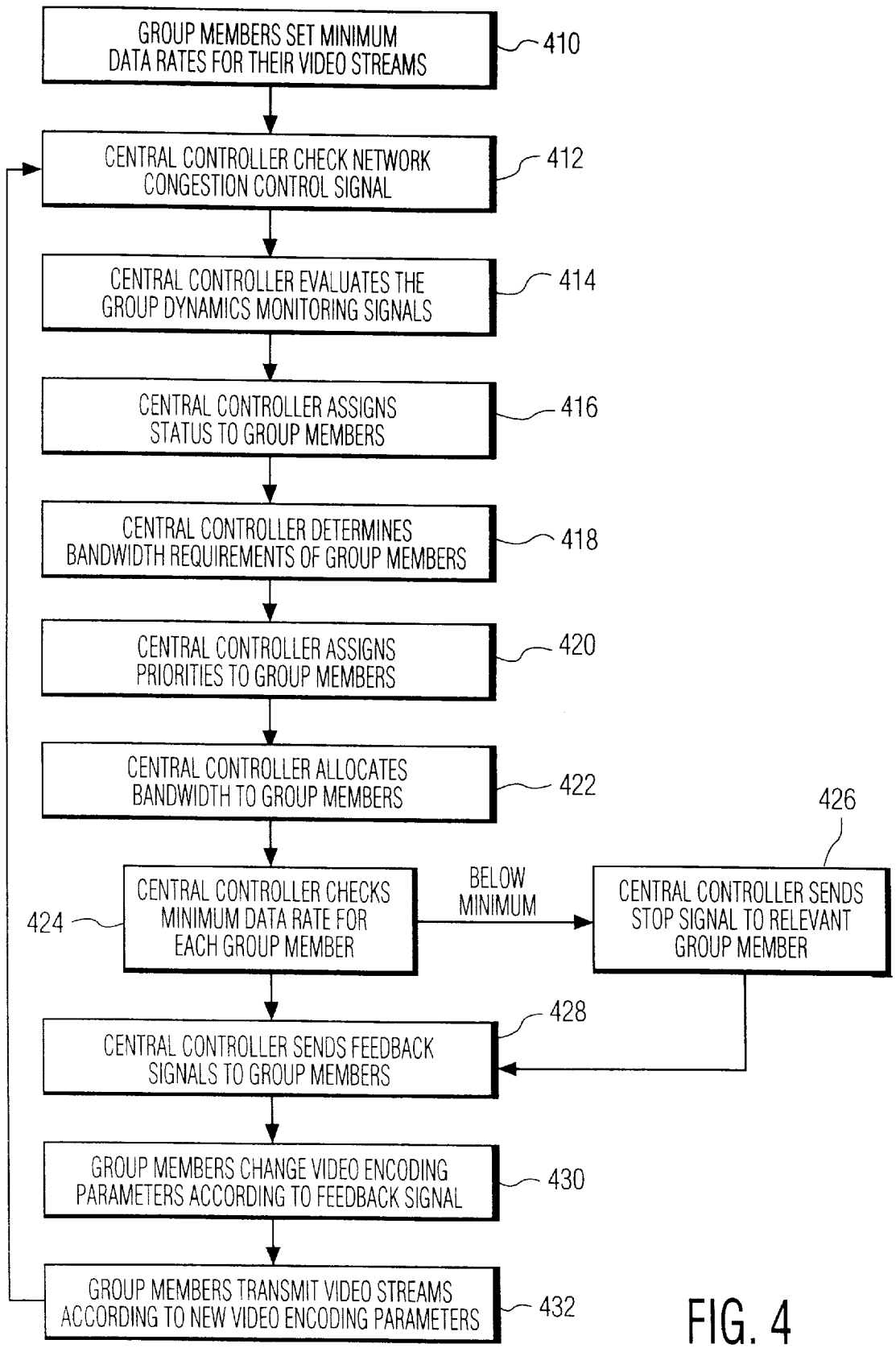
FIG. 4 is a block diagram illustrating the steps of the present invention.

FIG. 4 is a block diagram illustrating the processes involved. Initially, the group members set minimum data rates 410 for their respective video streams. In this example, the network congestion control signal is checked 412 and the various group dynamics monitoring signals are evaluated 414. Upon evaluation, the controller assigns a status value 416 to each group member and determines the bandwidth requirements of each group member 418. Next, the controller assigns priorities 420 and allocates bandwidth 422 to the group members. A check 422 by the controller is performed to ensure that each group member is at or above their minimum data rate. If so, then the controller sends 428 the feedback signals to the group members. If not, then the controller will issue a stop signal 426 to the relevant group member before sending the feedback signals 428 to the group members. The group members then process the feedback signals 430 and change their video encoding parameters accordingly prior to sending out 432 their respective video streams. The process is started over again upon receipt of a new network congestion control signal and/or a new set of group dynamics monitoring signals.

Although the embodiment described utilizes the network congestion control signal, clearly this signal could be removed and not considered.

It is to be understood that the foregoing disclosure taught and described herein is illustrative of the present invention. Modifications may readily be devised by those ordinarily skilled in the art without departing from the spirit or scope of the present invention.

What is claimed is:

1. A system for bandwidth allocation to a group of devices or applications comprising:
   a plurality of group member devices or applications capable of video stream transmission and reception, wherein each group member device or application is capable of broadcasting video streams to the entire group and receiving video streams from the entire group, said group member devices or applications linked together in a network; and
   a controller for receiving group dynamic monitoring signals from each group member device or application, said group dynamic monitoring signals indicating a variety of activity of each group member, wherein the group dynamic monitoring signals are used to assign priorities to said video streams according to a set of rules, and said priorities are used for determining bandwidth requirements of each group member device or application and allocating a bandwidth, via a feedback signal to each group member device or application.

2. The system of claim 1, wherein said controller is also linked to said network and receives a network congestion control signal from said network indicating an overall quality of delivered video streams, said network congestion control signal for use, along with said group dynamic monitoring signals, in determining bandwidth requirements of each group member device or application and allocating the bandwidth for each group member device or application.

3. The system of claim 1, wherein each group member device or application sets a content based minimum data rate bandwidth requirement which it requires to send a video stream and forwards its minimum data rate bandwidth requirement to the controller.

4. The system of claim 3, wherein the controller checks whether each group member's minimum data rate bandwidth requirement is met and, if a group member's minimum data rate bandwidth requirement cannot be achieved without sacrificing a higher priority group member's data rate bandwidth requirements, said controller sends a stop signal to the group member device or application.

5. The system of claim 4, wherein said network congestion control signal is periodically updated in the controller and each time a new network congestion control signal is updated, the controller re-determines and re-allocates the bandwidth requirements of each group member device or application.

6. The system of claim 4, wherein said group dynamics monitoring signals are periodically updated by each group member device or application and each time a new group dynamics monitoring signal is sent to the controller, the controller re-determines and re-allocates the bandwidth requirements of each group member device or application.

7. The system of claim 6, wherein said network is any video or audio communications network.

8. The system of claim 7, wherein said network is an internet based video or audio communications network.

9. A method of bandwidth allocation to a group of devices or applications comprising the steps of:
   a. monitoring a variety of activity of a plurality of group members engaged in a multi-cast video stream communication network;
   b. monitoring congestion of the multi-cast video stream communication network;
   c. determining and assigning a status and priority to each group member based on the activity of the group as a whole;
   d. allocating a bandwidth to each group member based upon said status and priority; and
   e. periodically updating the status and priority values of each group member based on continued monitoring of network congestion and group activity.

10. The method of claim 9, wherein said network is a video conferencing communications network.

11. The method of claim 10, wherein said network is an internet based video conferencing communications network.

* * * * *